June 16, 1964　　J. F. STEIGERWALD　　3,137,028
ROLLER DEVICE FOR SLIDING CLOSURES
Filed Sept. 24, 1962　　2 Sheets—Sheet 1
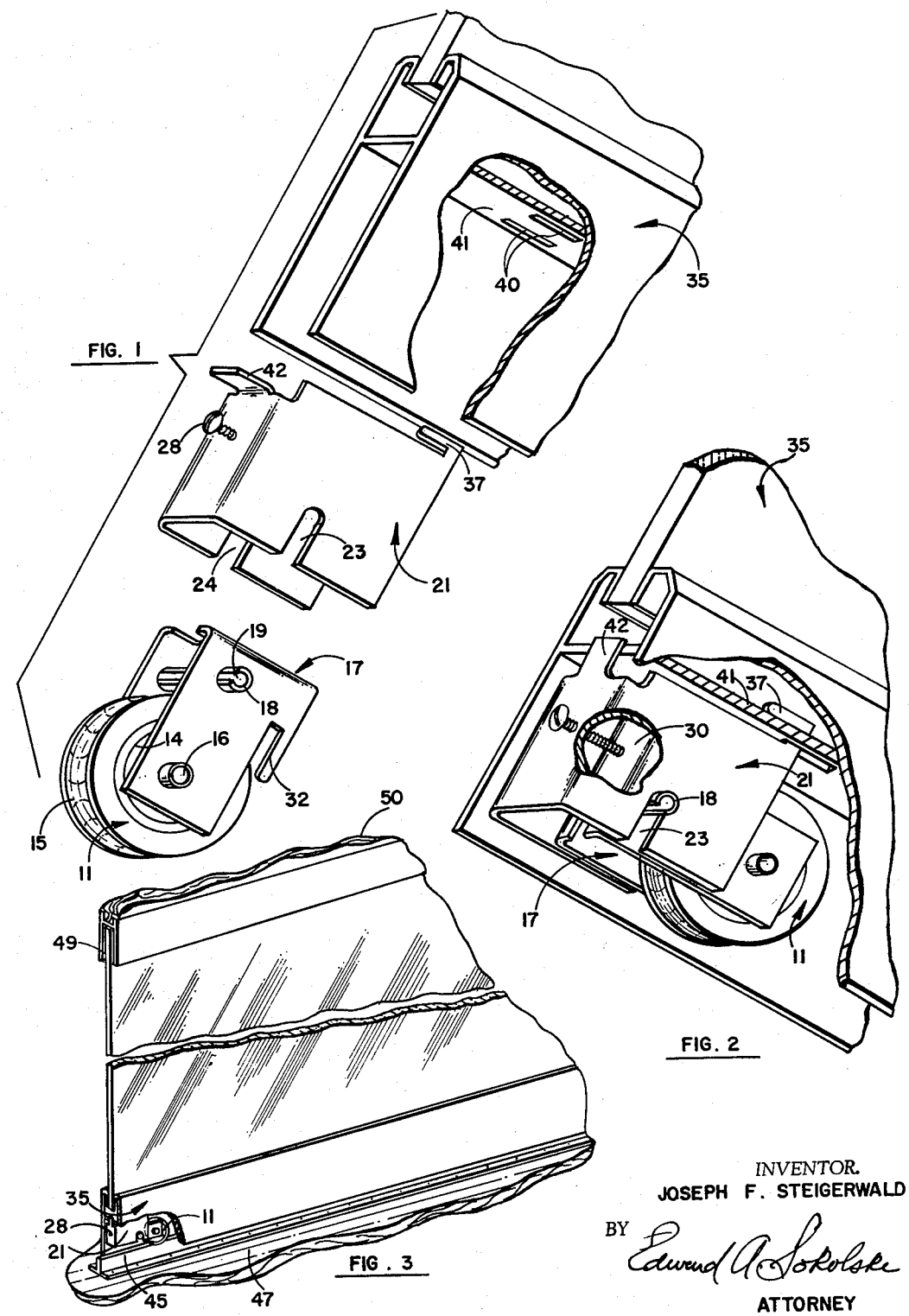
INVENTOR.
JOSEPH F. STEIGERWALD
BY Edward A. Sokolski
ATTORNEY June 16, 1964   J. F. STEIGERWALD   3,137,028
ROLLER DEVICE FOR SLIDING CLOSURES
Filed Sept. 24, 1962   2 Sheets-Sheet 2

INVENTOR.
JOSEPH F. STEIGERWALD
BY
Edward A. Sokoloski
ATTORNEY

United States Patent Office

3,137,028
Patented June 16, 1964

3,137,028
ROLLER DEVICE FOR SLIDING CLOSURES
Joseph F. Steigerwald, 114 S. Catalina Ave.,
Redondo Beach, Calif.
Filed Sept. 24, 1962, Ser. No. 225,755
5 Claims. (Cl. 16—105)

This invention relates to a roller device for sliding closures, and more particularly to such a device which can be readily removed and replaced and which is capable of adjustment in height relative to the closure after it has been installed thereon.

Most sliding closures such as sliding doors and windows utilize rollers mounted on the bottom portions thereof which slide in a track attached to the base of the door or window aperture. In such devices of the prior art, the roller member is generally attached to the closure with several screws and can be removed only by partial disassembly of the base of the closure. This makes the replacement of the rollers when they become worn out a chore. In addition, the roller members of most of such prior art devices have a set position relative to the closure and cannot be adjusted in height relative thereto. This means that variations in height of the door or window aperture cannot be compensated for.

Such variations may be appreciable in a large scale construction project. Additional variations may have to be accounted for after construction has been completed due to settling of the structure surrounding the door or window apertures. Such variations in dimensions which appear both at the time of construction and subsequently often result in a sliding closure which is either too loosely or too tightly fitted to function properly.

The device of this invention overcomes the aforementioned short comings of the prior art by providing a roller device which can readily be removed and replaced and which can easily be adjusted in height after installation by means of a screw driven adjustment. This improved roller device further is constructed so that a single type unit can be installed either on the right or left-hand end of the closure with no requirement for separate right and left-hand units as many of the prior art devices require.

The device of this invention utilizes a support bracket which is attached to the bottom of the closure. A roller wheel is rotatably mounted on a support assembly. There is an attachment pin on either the support bracket or support assembly, this attachment pin having its longitudinal axis parallel to the rotation axis of the roller wheel. The other of these two members has a pair of oppositely positioned slots formed in opposite sides thereof. The pin has one transverse dimension which closely but easily permits the pin to fit into the slots. The transverse dimension of the pin normal to this first mentioned dimension is slightly greater, so that when the support assembly carrying the roller wheel is rotated approximately 90 degrees and the pin thereby rotated in the slots, the pin will become attached to the support bracket in a holding fit. The roller wheel support assembly can readily be removed from the support bracket by rotating it 90 degrees back again to the position at which it was inserted.

Once the roller wheel support assembly has been installed in the support bracket, it can be adjusted rotatably relative thereto to increase or decrease the effective longitudinal dimension of the closure. This is achieved by means of an adjustment screw which is mounted on either the support bracket or the wheel assembly. The end of this screw abuts against the side of either the roller wheel support assembly or the support bracket as the case may be, and as the screw is turned, this support assembly is rotated relative to the bracket thereby effectively changing the distance that the wheel extends downward therefrom.

It is therefore an object of this invention to provide an improved roller device for sliding closures.

It is a further object of this invention to facilitate the removal and replacement of roller devices in sliding closures.

It is a still further object of this invention to provide a roller device for sliding closures which can be adjusted in height after installation.

It is a still further object of this invention to provide a roller device for sliding closures in which a single unit can be used as either the right or left-hand closure roller.

Other objects of this invention will become apparent after the following description taken in connection with the accompanying drawings of which FIG. 1 is an exploded view of a preferred embodiment of the device of the invention;

FIG. 2 is a perspective view of the preferred embodiment of the device of the invention shown assembled and installed in a sliding closure device;

FIG. 3 is a perspective view of the preferred embodiment of the device of the invention shown operating as the roller device for a sliding glass door.

Figure 4:
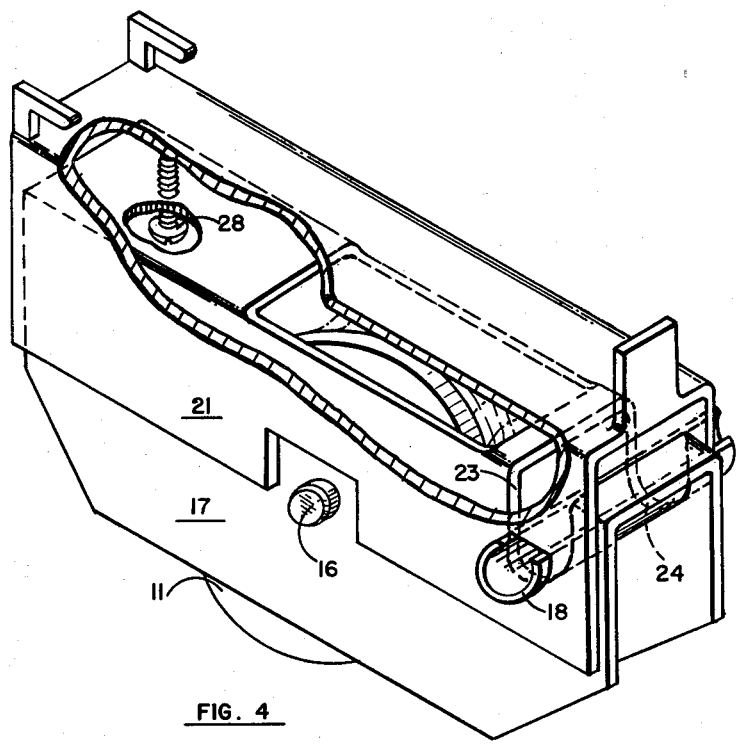
FIG. 4 is a perspective view of a second embodiment of the device of the invention.

Referring to FIGS. 1 and 2, wheel member 11 which may include a ball bearing roller 14 having a grooved tire 15 attached thereto is mounted for rotation about shaft 16 which is fixedly attached to support member 17. Support member 17 has a pin member 18 thereon which has its longitudinal axis positioned substantially parallel to the rotation axis of wheel member 11.

Pin member 18 is in the form of a hollow cylinder having a slit 19 separating one side thereof. This side of the pin is flattened so that the effective transverse dimension of the pin along an axis running through the center of slit 19 is slightly less than the transverse dimension of the pin on an axis normal to this first mentioned axis.

Support bracket 21 has a pair of slots 23 and 24 formed therein. These slots are positioned opposite each other and have a transverse dimension which is equal to or a little greater than the effective transverse dimension of pin 18 along the axis running through the center of slit 19. Pin 18 can therefore readily be inserted into slots 23 and 24 with support member 17 in an angular position relative to bracket 21 as indicated in FIG 1. After pin 18 has been inserted all the way into the slots, support member 17 is rotated 90 degrees relative to support bracket 21 as indicated in FIG. 2 to produce a holding fit between pin 18 and the support bracket.

Adjustment screw 28 is threadably attached to support bracket 21. In the assembled unit (FIG. 2) the end of adjustment screw 28 abuts against the end wall 30 of support member 17. When screw 28 is tightened by clockwise rotation, support member 17 is rotated relative to bracket 21 about the axis of pin 18. This forces wheel member 11 downward. In working embodiments of the device of the invention, wheel member 11 can be moved downward a maximum of about ½ inch, and such a range of adjustment has been found adequate to handle any exigencies which generally arise in the field. Screw 28 is initially positioned at the top of the range of adjustment, and then when the closure is installed, the slack between the closure and the door or window aperture is taken up to make for a near perfect fit. Should there subsequently be a tightening of the rolling action due to a change of dimensional conditions, screw 28 can be loosened to unblock the wheel member thereby permitting it to move upward as necessary under the weight of the closure member to which it is attached.

A pair of oppositely located ears 32 (only one is shown) which are bent outwardly slightly are utilized to provide frictional holding action of support member 17 to bracket 21 when these two pieces are in mating engagement. Such holding action is not required when wheel member 11 is supporting a load, but is required to keep the pieces together during shipment and handling of the parts when they are so preassembled.

Support bracket 21 is attached to closure member 35 by means of oppositely located tabs 37, only the right-hand one of which is shown. These tabs fit into slots 40 formed in the web structure 41 of closure member 35. After they have been properly inserted in the slots, tabs 37 are bent outwardly or inwardly. End tab 42 is then bent upward to abut against the end of the closure member, and the combined action of tabs 37 and end tab 42 locks bracket 21 to the closure member as shown in FIG. 2. Other means may be used to join the support bracket to the closure such as, for example, machine screws acting in conjunction with slots located on the closure member either above or below the web.

Referring now to FIG. 3, the device of the invention is shown in operation as used to support a sliding glass door. Support bracket 21 is attached to the door 35 by the means illustrated in FIG. 2. The grooved tire 15 of wheel member 11 rides along track 45 which is attached to the floor 47. The top of the door slides in groove 49 formed in top support member 50. The downward extent of wheel member 11 is adjustable by means of adjusting screw 28.

Referring to FIG. 4, a second embodiment of the device of the invention is illustrated. The same numerals are utilized in this figure to designate like parts of FIGS. 1-3. This embodiment differs from the first embodiment in that the slots 23 and 24 are formed in wheel support member 17 rather than support bracket 21 while the pin member 18 is part of the support bracket rather than the support member. Also adjustment screw 28 is threadably attached to support member 17 rather than support bracket 21 and abuts against a wall of the support bracket rather than the support member.

In attaching support member 17 to support bracket 21, the slotted portions 23 and 24 are slipped over pin member 18 with the support member in a vertical position (i.e., rotated 90 degrees counterclockwise from the position shown in FIG. 4). The support member 17 is then rotated 90 degrees clockwise to the position shown in FIG. 4 to produce a holding fit between the support member and the support bracket. The downward extent of wheel member 11 is adjusted by means of screw 28 which is threadably attached to wheel support member 17 and abuts against the top inner wall of support bracket 21.

In the embodiment of FIG. 4, adjustment screw 28 is hidden from view which gives this embodiment aesthetic advantages. However, to adjust this screw, ordinarily the closure with which the device is utilized must be removed from the aperture frame.

The device of this invention thus provides an improved roller device for sliding closures such as windows and doors which can easily be removed and replaced in the field and can be closely adjusted to accommodate variations in height of the closure aperture.

While this invention has been described and illustrated in detail, it is to be clearly understood that this is intended by way of illustration and example only and not by way of limitation, the spirit and scope of the invention being limited only by the terms of the following claims.

I claim:

1. A roller device for a sliding closure comprising a wheel,
   support means for rotatably supporting said wheel,
   support bracket means,
   one of said means having a pin member thereon, the longitudinal axis of said pin member being substantially parallel to the rotation axis of said wheel, said pin member having a greater dimension along one transverse axis thereof than the transverse axis normal to said one axis,
   the other of said means having a pair of opposite sides joined by a third side, said opposite sides each having an open ended slot formed therein positioned directly opposite each other, the transverse dimension of each of said slots being at least equal to the dimension of said pin member along said transverse axis normal to said one axis and slightly less than the dimension of said pin member along said one transverse axis,
   said support means being removably attached to said support bracket means by placing the end portions of said pin member in said slots with the transverse axes normal to said one axis thereof substantially parallel to the transverse axes of said slots and then bringing said one axis of said pin member approximately parallel to the transverse axes of said slots, said pin member thereby being held in said slots, and
   an adjustment screw threadably attached to one of said means, the end of said screw abutting against the other of said means,
   said support bracket means being attached to said closure.

2. The device as recited in claim 1 wherein said pin member is in the form of a hollow cylinder having one side thereof separated along the longitudinal axis thereof.

3. A roller device for a sliding closure comprising,
   a wheel,
   support means for rotatably supporting said wheel, said support means having a pin member thereon, the longitudinal axis of said pin member being substantially parallel to the rotation axis of said wheel, said pin member having a greater dimension along one transverse axis thereof than the transverse axis normal to said one axis,
   a support bracket having a pair of opposite sides joined by a third side, said opposite sides each having a slot formed therein, said slots running from one edge of each of said opposite sides and being located directly opposite each other, the transverse dimension of each of said slots being at least equal to the dimension of said pin member along said transverse axis normal to said one axis, and slightly less than the dimension of said pin member along said one transverse axis,
   said pin member being removably attached to said support bracket by inserting the end portions thereof in said slots with the transverse axis normal to said one axis thereof approximately parallel to the transverse axes of said slots and then bringing said one axis of said pin member substantially parallel to the transverse axes of said slots to provide a holding fit of said pin member in said slots, and
   an adjustment screw threadably attached to said third side of said support bracket, the end of said screw abutting against said support means,
   said support bracket being attached to said closure.

4. The device as recited in claim 3 wherein said pin member is a hollow cylinder separated on one side thereof by a longitudinal slit.

5. In a roller device for a sliding closure,
   a wheel,
   means for rotatably supporting said wheel,
   support bracket means,
   one of said aforementioned means having a pair of oppositely positioned open ended slots formed therein, the other of said means having an attachment pin thereon, said attachment pin having a greater dimension along one transverse axis thereof than the transverse axis thereof normal to said one axis, the dimension of said slots along the transverse axes thereof being substantially equal to the dimension of said attachment pin along the transverse axis thereof normal to said one axis,
   said wheel supporting means being removably attached to said support bracket means by placing the end portions of said pin in said slots with the transverse axis normal to said one axis thereof approximately parallel to the transverse axes of said slots and then bringing said one transverse axis of said pin approximately parallel to the transverse axes of said slots, said pin thereby being held in said slots, and adjustment means mounted on one of said aforementioned means for rotatably positioning said wheel supporting means relative to said support bracket means, said adjustment means comprising a screw threadably engaging one of said aforementioned means, one end of said screw abutting against a wall of the other of said aforementioned means.

References Cited in the file of this patent
UNITED STATES PATENTS

| | | |
|---|---|---|
| 637,677 | Shively | Nov. 21, 1899 |
| 1,079,986 | Knap | Dec. 2, 1913 |
| 2,668,318 | Lee Bon | Feb. 9, 1954 |
| 2,940,558 | Schueter | June 14, 1960 |
| 2,980,947 | Rust et al. | Apr. 25, 1961 |
| 3,060,524 | Tucker | Oct. 30, 1962 |
| 3,074,519 | Soeder | Jan. 22, 1963 |